US011489859B2

United States Patent
Reddy et al.

(10) Patent No.: US 11,489,859 B2
(45) Date of Patent: Nov. 1, 2022

(54) SYSTEM AND METHOD FOR RETRIEVING AND EXTRACTING SECURITY INFORMATION

(71) Applicant: International Institute of Information Technology, Hyderabad, Hyderabad (IN)

(72) Inventors: Y Raghu Babu Reddy, Hyderabad (IN); Lalit Mohan Sanagavarapu, Hyderabad (IN); Vasudeva Varma, Hyderabad (IN)

(*) Notice: Subject to any disclaimer, the term of this patent is extended or adjusted under 35 U.S.C. 154(b) by 684 days.

(21) Appl. No.: 16/421,343

(22) Filed: May 23, 2019

(65) Prior Publication Data

US 2019/0364068 A1 Nov. 28, 2019

(30) Foreign Application Priority Data

May 23, 2018 (IN) .............................. 201841019409

(51) Int. Cl.
*H04L 9/40* (2022.01)
*G06F 16/951* (2019.01)
*G06N 3/08* (2006.01)
*G06N 3/04* (2006.01)
*G06F 16/2457* (2019.01)

(52) U.S. Cl.
CPC .... *H04L 63/1433* (2013.01); *G06F 16/24578* (2019.01); *G06F 16/951* (2019.01); *G06N 3/0445* (2013.01); *G06N 3/08* (2013.01)

(58) Field of Classification Search
CPC ..... H04L 63/1433; H04L 63/168; G06N 3/08; G06F 16/951; G06F 16/24578
See application file for complete search history.

(56) References Cited

U.S. PATENT DOCUMENTS

| | | | | |
|---|---|---|---|---|
| 7,613,687 B2* | 11/2009 | Nye | ...................... | G06F 16/954 |
| 9,607,030 B1* | 3/2017 | Chakra | .................... | G06F 16/22 |
| 2008/0072300 A1* | 3/2008 | Garbow | .............. | H04L 63/0815 726/8 |
| 2008/0086467 A1* | 4/2008 | Crumb | ................... | G06F 16/951 |
| 2011/0167054 A1* | 7/2011 | Bailey | .................. | G06F 16/358 707/710 |
| 2012/0109974 A1* | 5/2012 | Feng | ..................... | G06F 40/143 707/748 |
| 2012/0239731 A1* | 9/2012 | Shyamsunder | ....... | G06F 16/957 709/203 |

(Continued)

*Primary Examiner* — Etienne P Leroux

(57) ABSTRACT

A system and method for retrieving and extracting security information is provided. The method includes (i) extracting seed Uniform Resource Locators (URLs) from social media based on keywords that are identified for each sub-domain, (ii) crawling a security related content in the extracted seed URLs to determine relevant URLs that are related to a security domain from the extracted seed URLs, (iii) classifying the security related content into sub-domains of security to obtain domain coverage, (iv) extracting text that include acronyms from the relevant URLs, (v) automatically evolving a security ontology based on extracted text using a Long Short-Term Memory (LSTM) deep Learning model, (vi) ranking search results by accessing credibility of the URLs that include the security related content based on domain relevance and (vii) providing the ranked search results that includes trends.

13 Claims, 4 Drawing Sheets

(56) References Cited

U.S. PATENT DOCUMENTS

| | | | |
|---|---|---|---|
| 2013/0046601 A1* | 2/2013 | Skelton | G06Q 30/0256 |
| | | | 705/14.25 |
| 2014/0149741 A1* | 5/2014 | Balakrishnan | G06F 21/335 |
| | | | 713/159 |
| 2016/0248793 A1* | 8/2016 | Howes | G06F 16/34 |
| 2016/0259818 A1* | 9/2016 | Prosnitz | G06F 16/9535 |
| 2016/0314125 A1* | 10/2016 | Witwer | G06F 16/319 |
| 2017/0070480 A1* | 3/2017 | Blumenfeld | H04W 12/04 |
| 2017/0083524 A1* | 3/2017 | Huang | H04N 21/4826 |
| 2017/0111384 A1* | 4/2017 | Loureiro | H04L 63/1441 |
| 2018/0063168 A1* | 3/2018 | Sofka | H04L 63/1416 |

* cited by examiner

SYSTEM AND METHOD FOR RETRIEVING AND EXTRACTING SECURITY INFORMATION

BACKGROUND

Technical Field

Embodiments of this disclosure generally relates to providing security for search engine, more particularly, to a system and method for retrieving and extracting security information.

Description of the Related Art

Increased usage of computers and Internet bring in related security threats, vulnerabilities, etc. While at a personal level, an anti-virus software and an organization level-Defense in Depth mechanisms exist to protect data. However, there is no single site exists to obtain information related to security threats, vulnerabilities, products, researchers, trends, etc.

Existing generic search engines acts as a single site for security information. However, the security information has ambiguity, irrelevancy, bias and other credibility issues. As they are generic search engines, they do not contain information specific to a particular domain.

Existing solution may (a) use a Generic search engine that contain relevance issues, (b) feed from providers such as AlientVault, Symantec DeepSight, IBM x-Force and others that are very expensive (~150K USD per annum), and they are limited only to threat information and not on other security information needs such as products, researchers, trends, etc., and (c) the existing work on seed URL identification are manual and do not assure subdomain coverage.

Accordingly, there remains a need for a system and method for retrieving and extracting security information.

SUMMARY

In view of the foregoing, embodiments herein provide a method for retrieving and extracting security information. The method includes the steps of (i) extracting seed Uniform Resource Locators (URLs) from social media based on a plurality of keywords that are identified for each sub-domain, (ii) crawling a security related content in the extracted seed URLs to determine relevant URLs that are related to a security domain from the extracted seed URLs, (iii) classifying the security related content into a plurality of sub-domains of security to obtain domain coverage, (iv) extracting text that include acronyms from the relevant URLs, (v) automatically evolving a security ontology based on extracted text using a Long Short-Term Memory (LSTM) deep Learning model, (vi) ranking search results by accessing credibility of the URLs that include the security related content based on domain relevance and (vii) providing the ranked search results that includes trends on at least one of (a) security Vulnerabilities, (b) threats, (c) incidents and (d) controls to a security expert for security analysis In some embodiments, the seed URLs are extracted using at least one of (i) standard industrial classification (SIC) and (ii) Machine Learning techniques.

In some embodiments, the security related content in the relevant URLs are classified using at least one of (i) Phrase2Vec or (ii) evolving Ontology based technique. In some embodiments, the evolution of ontology technique is based on a bi-directional Long Short-Term Memory (LSTM).

In some embodiments, the classified security related content identifies at least one of (i) vulnerabilities, (ii) threats, (iii) incidents and (iv) controls in the extracted seed URLs.

In some embodiments, the credibility of the URLs that include (i) source of information, (ii) genre of site and (iii) content coverage.

In some embodiments, the method includes the steps of (i) validating a relevance text between webpage extracted text and an acronym list to identify a full form of a phrase and (ii) indexing a document term for latent semantic analysis using indexing techniques.

In some embodiments, the search results include (i) relevant security specific search results and (ii) trends on the security vulnerabilities, the threats, the incidents and the controls.

In one aspect, a system for retrieving and extracting security information is provided. The system includes a memory that stores a set of instructions and a processor that executes the set of instructions and is configured to (i) extract seed Uniform Resource Locators (URLs) from social media based on a plurality of keywords that are identified for each sub-domain, (ii) crawl a security related content in the extracted seed URLs to determine relevant URLs that are related to a security domain from the extracted seed URLs, (iii) classify the security related content into a plurality of subdomains of security to obtain domain coverage, (iv) extract text that include acronyms from the relevant URLs, (v) automatically evolve a security ontology based on extracted text using a Long Short-Term Memory (LSTM) deep Learning model, (vi) rank search results by accessing credibility of the URLs that include the security related content based on domain relevance and (vii) provide the ranked search results that includes trends on at least one of (a) security Vulnerabilities, (b) threats, (c) incidents and (d) controls to a security expert for security analysis.

In some embodiments, the security related content in the relevant URLs are classified using at least one of (i) Phrase2Vec or (ii) evolving Ontology based technique. In some embodiments, the evolution of ontology technique is based on a bi-directional Long Short-Term Memory (LSTM).

In some embodiments, the seed URLs are extracted using at least one of (i) standard industrial classification (SIC) and (ii) Machine Learning techniques.

In another aspect, one or more non-transitory computer readable storage mediums storing one or more sequences of instructions, which when executed by one or more processors, causes a method for retrieving and extracting security information, the method includes The method includes the steps of (i) extracting seed Uniform Resource Locators (URLs) from social media based on a plurality of keywords that are identified for each sub-domain, (ii) crawling a security related content in the extracted seed URLs to determine relevant URLs that are related to a security domain from the extracted seed URLs, (iii) classifying the security related content into a plurality of sub-domains of security to obtain domain coverage, (iv) extracting text that include acronyms from the relevant URLs, (v) automatically evolving a security ontology based on extracted text using a Long Short-Term Memory (LSTM) deep Learning model, (vi) ranking search results by accessing credibility of the URLs that include the security related content based on domain relevance and (vii) providing the ranked search results that includes trends on at least one of (a) security Vulnerabilities, (b) threats, (c) incidents and (d) controls to a security expert for security analysis.

In some embodiments, the seed URLs are extracted using at least one of (i) standard industrial classification (SIC) and (ii) Machine Learning techniques.

In some embodiments, the security related content in the relevant URLs are classified using at least one of (i) Phrase2Vec or (ii) evolving Ontology based technique. In some embodiments, the evolution of ontology technique is based on a bi-directional Long Short-Term Memory (LSTM).

In some embodiments, the classified security related content identifies at least one of (i) vulnerabilities, (ii) threats, (iii) incidents and (iv) controls in the extracted seed URLs.

In some embodiments, the method includes the steps of (i) validating a relevance text between webpage extracted text and an acronym list to identify a full form of a phrase and (ii) indexing a document term for latent semantic analysis using indexing techniques.

The system and method are used to automatically identifying Seed URLs in an exploratory and exploitation technique. The system and method identify top Vulnerabilities, threats, incidents and controls from evolving knowledge base.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
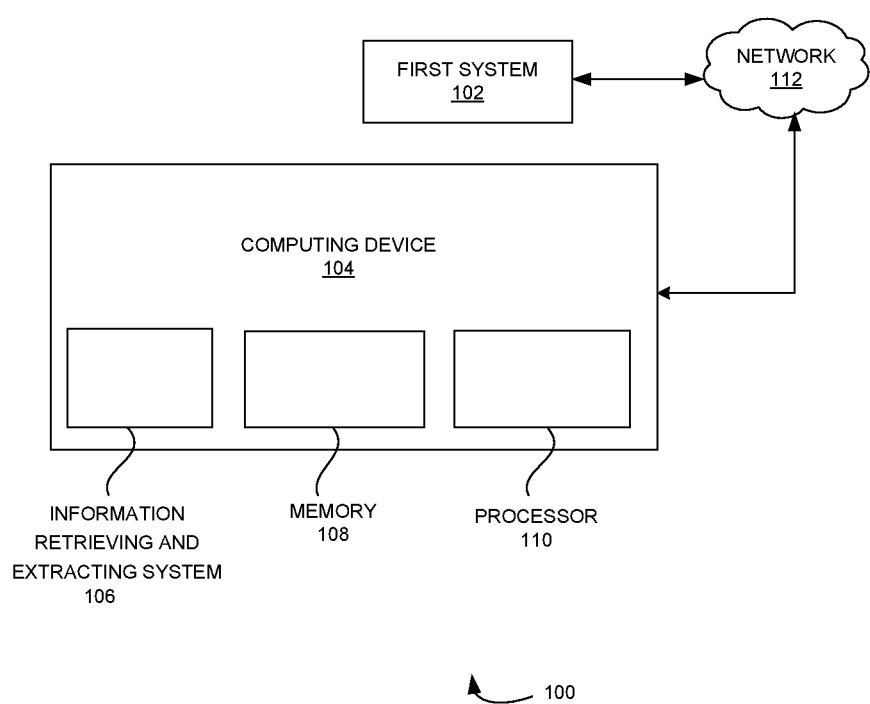
FIG. 1 is a block diagram that illustrates a system that retrieves and extracts security information according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for retrieving and extracting security information. Referring now to the drawings, and more particularly to FIGS. 1 through 4, where similar reference characters denote corresponding features consistently throughout the figures, there are shown preferred embodiments.

FIG. 1 is a block diagram that illustrates a system 100 that retrieves and extracts security information according to embodiments herein. The system 100 includes a first system 102, and a computing device 104. A user may interact with the computing device 104. The user may be a security expert. The computing device 104 includes an information retrieving and extracting system 106, a memory 108 that stores a database and a set of instructions, and a processor 110 that is configured to execute the set of instructions. In some embodiments, the computing device 104 may be a mobile phone, a kindle, a PDA (Personal Digital Assistant), a tablet, a music player, a computer, an electronic notebook or a smartphone. In some embodiments, the information retrieving and extracting system 106 obtains one or more keywords from the user. The information retrieving and extracting system 106 extracts seed Uniform Resource Locators (URLs) from the first system 102 through the network 112 based on the one or more keywords that are identified for each sub-domain. In some embodiments, the first system 102 is a social media. In some embodiments, the social media is at least one of (i) Twitter, (ii) Wikipedia, (iii) Facebook, etc. In some embodiments, the network 112 is a wired network. In some embodiments, the network 112 is a wireless network such as Bluetooth, Wi-Fi, ZigBee or any other communication networks.

The information retrieving and extracting system 106 includes a seed URL data base that stores the extracted seed URLs. The information retrieving and extracting system 106 crawls a security related content in the extracted seed URLs to obtain relevant URLs that are related to a security domain from the extracted seed URLs that are stored in the seed URL data base. In some embodiments, the information retrieving and extracting system 106 identifies the relevant URLs in terms of building an Ontology or a Graph, knowledge of content in HTML anchor text and others from the extracted seed URLs in the seed URL data base. The information retrieving and extracting system 106 classifies the security related content into one or more subdomains of security to obtain domain coverage. In some embodiments, the security related content in the relevant URLs are classified using at least one of (i) Phrase2Vec or (ii) evolving Ontology based techniques. In some embodiments, the evolution of ontology technique is based on a bi-directional Long Short-Term Memory (LSTM). In some embodiments, the classified security related content identifies at least one of (i) vulnerabilities, (ii) threats, (iii) incidents and (iv) controls in the extracted seed URLs. The information retrieving and extracting system 106 extracts text that includes acronyms from the relevant URLs. In some embodiments, the information retrieving and extracting system 106 validates a relevance text between web page extracted text and an acronym list to identify a full form of a phrase. In some embodiments, the information retrieving and extracting system 106 indexes a document term for latent semantic analysis using indexing techniques.

The information retrieving and extracting system 106 automatically evolves a security ontology based on extracted text using Long Short-Term Memory (LSTM) deep Learning models. The information retrieving and extracting system 106 ranks search results by accessing credibility of the URLs that include the security related content based on domain relevance. In some embodiments, the credibility of the URLs that include (i) source of information, (ii) genre of site and (iii) content coverage. Further, the information retrieving and extracting system 106 provides search results that includes trends on at least one of (i) security Vulnerabilities, (ii) threats, (iii) incidents and (iv) controls to a security expert for security analysis. In some embodiments, the search results that include (i) relevant security specific search results and (ii) trends on the security vulnerabilities, the threats, the incidents and the controls.

Figure 2:
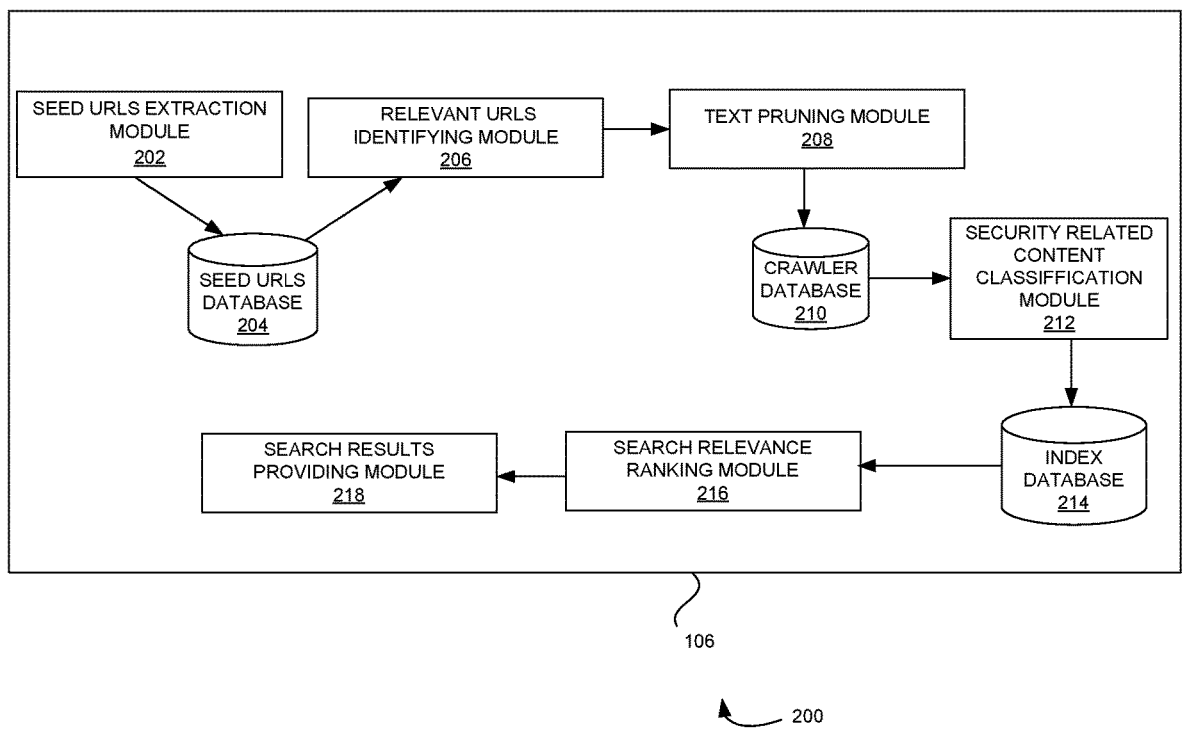
FIG. 2 is a block diagram of an information retrieving and extracting system of FIG. 1 according to some embodiments herein.

FIG. 2 is a block diagram 200 of the information retrieving and extracting system 106 of FIG. 1 according to some embodiments herein. The block diagram 200 includes a seed URLs extraction module 202, a seed URLs database 204, a relevant URLs identifying module 206, a text pruning module 208, a crawler database 210, a security related content classification module 212, an index database 214, a search relevance ranking module 216 and a search results providing module 218. The seed URLs extraction module 202 extracts seed URLs from the first system 102 based on one or more keywords that are identified for each sub-domain. In some embodiments, the seed URLs data base 204 stores the extracted URLs from the seed URLs extraction module 202. The relevant URLs identifying module 206 crawls a security related content in the extracted seed URLs to determine relevant URLs that are related to a security domain from the extracted seed URLs from the extracted seed URLs in the seed URLs data base 204. The text pruning module 208 extracts text that includes acronyms from the relevant URLs. In some embodiments, the text pruning module 208 validates a relevance text between web page extracted text and an acronym list to identify a full form of a phrase and indexes a document term for latent semantic analysis using indexing techniques. In some embodiments, the text pruning module 208 stores the text pruned seed URLs in the crawler database 210. The security related content classification module 212 classifies the security related content into one or more subdomains of security to obtain domain coverage. In some embodiments, the security related content classification module 212 stores the information to identify the vulnerabilities, the threats, the incidents and the controls in the seed URLs in the index database 214. The search relevance ranking module 216 ranks search results by accessing credibility of the URLs that includes the security related content based on domain relevance. The search results providing module 218 provides the ranked search results that includes trends on at least one of (i) security Vulnerabilities, (ii) threats, (iii) incidents and (iv) controls to a security expert for security analysis.

Figure 3:
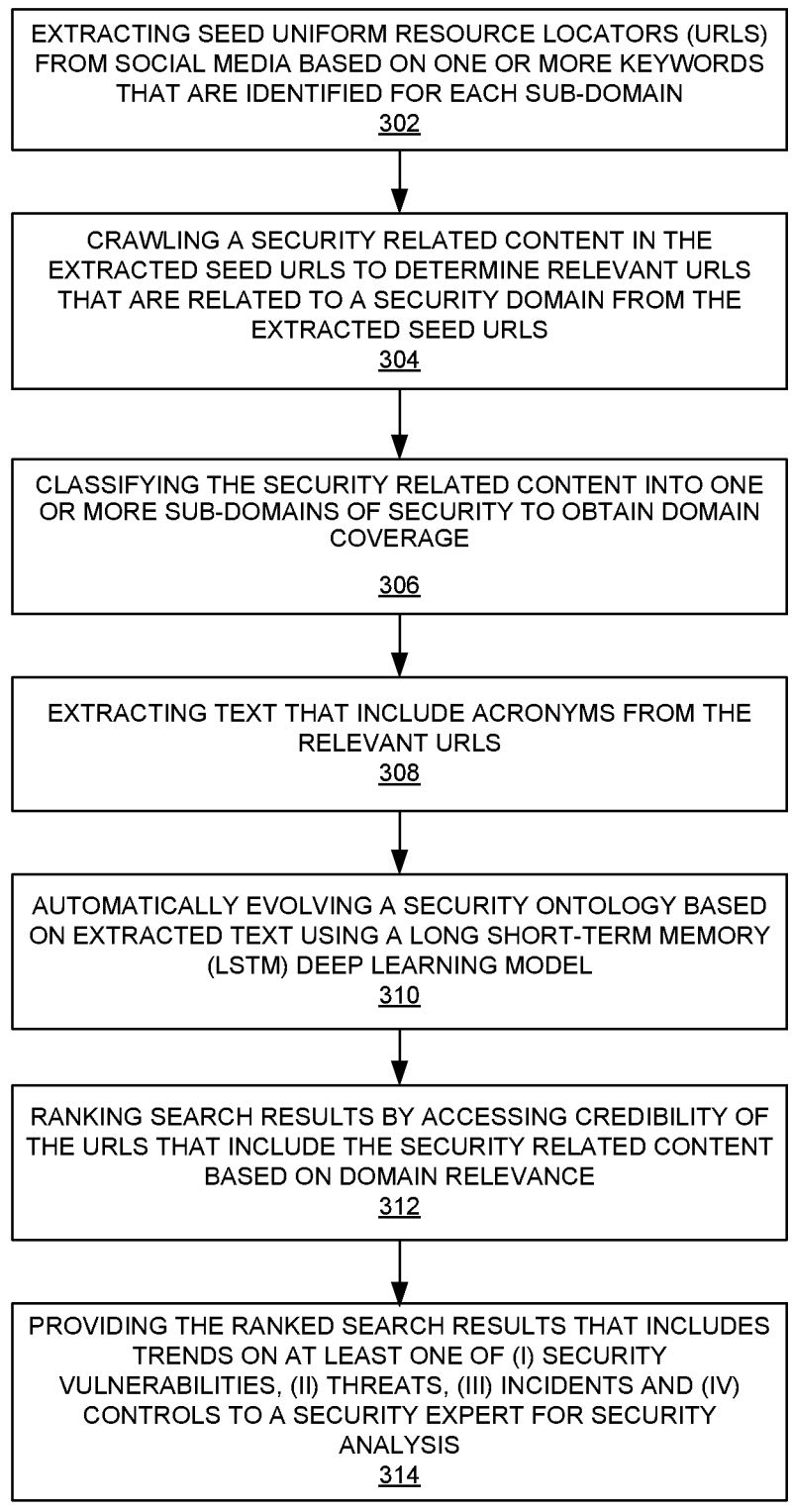
FIG. 3 is a flow diagram that illustrates a method for retrieving and extracting security information from the computing device using the information retrieving and extracting system according to some embodiments herein.

FIG. 3 is a flow diagram that illustrates a method 300 for retrieving and extracting security information according to some embodiments herein. At step 302, the method 300 includes extracting seed URLs from social media based on a plurality of keywords that are identified for each sub-domain. At step 304, the method 300 includes crawling a security related content in the extracted seed URLs to determine relevant URLs that are related to a security domain from the extracted seed URLs. At step 306, the method 300 includes classifying the security related content into one or more subdomains of security to obtain domain coverage. At step 308, the method 300 includes extracting text that include acronyms from the relevant URLs. At step 310, the method 300 includes automatically evolving a security ontology based on extracted text using a Long Short-Term Memory (LSTM) deep Learning model. At step 312, the method 300 includes ranking search results by accessing credibility of the URLs that include the security related content based on domain relevance. At step 314, the method 300 includes providing the ranked search results that includes trends on at least one of (i) security Vulnerabilities, (ii) threats, (iii) incidents and (iv) controls to a security expert for security analysis.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 4:
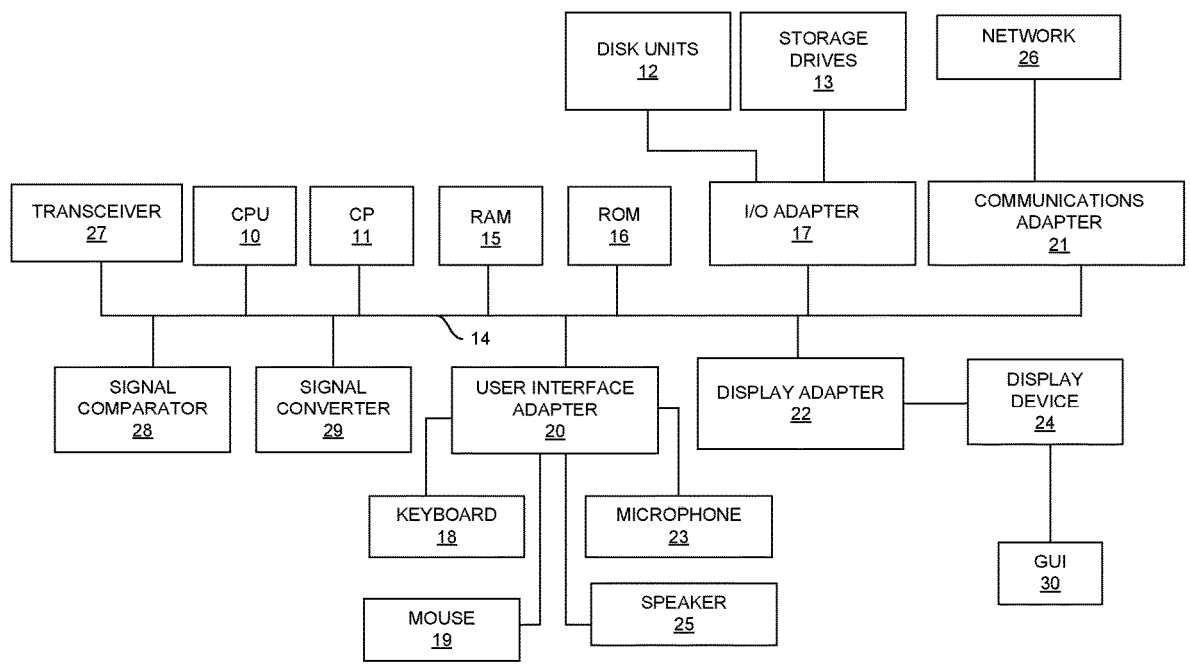
FIG. 4 illustrates a schematic diagram of computer architecture of a computing device, in accordance with some embodiments herein.

A representative hardware environment for practicing the embodiments herein is depicted in FIG. 4, with reference to FIGS. 1 through 3. This schematic drawing illustrates a hardware configuration of a server/computer system/user device in accordance with the embodiments herein. The computing device 104 includes at least one processing device 10. The special-purpose CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The computing device 104 can read the inventive instructions on the program storage devices and follow these instructions to execute the methodology of the embodiments herein. The computing device 104 further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23, which provides a graphical user interface (GUI) 29 of the output data in accordance with the embodiments herein, or which may be embodied as an output device such as a monitor, printer, or transmitter, for example. Further, a transceiver 26, a signal comparator 27, and a signal converter 28 may be connected with the bus 12 for processing, transmission, receipt, comparison, and conversion of electric or electronic signals.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for retrieving and extracting security information, said method comprising:
    extracting seed Uniform Resource Locators (URLs) automatically from social media based on a plurality of keywords that are identified for each sub-domain of a domain of the security information, wherein the plurality of keywords are obtained from a user associated with a first system;
    crawling a security related content in the extracted seed URLs to determine relevant URLs that are related to the domain of the security information from the extracted seed URLs, wherein the relevant URLs are identified by removing non-relevant URLs when a knowledge of content in a hypertext markup language (HTML) anchor text of the extracted seed URLs does not match with the plurality of keywords;
    extracting a text that comprise, (a) a full form of a phrase of the acronyms, and (b) document terms, from the relevant URLs by, (i) validating a relevance text between webpage extracted text and an acronym list to identify the full form of a phrase of the acronyms from the relevant URLs, and (ii) indexing, using indexing techniques, each document term from the relevant URLs by comparing, using latent semantic analysis, the webpage extracted text with text from each sub-domain;
    classifying the extracted text from the relevant URLs into a plurality of sub-domains of the domain of the security information to obtain domain coverage for the extracted text from the relevant URLs;
    upon utilizing the wide domain coverage, automatically evolving information security ontology based on the classified text using a Long Short-Term Memory (LSTM) deep Learning model;
    ranking, using the information security ontology, URLs for a search query by the user by accessing credibility of the URLs that comprise the security related content based on domain relevance; and
    extracting the security information from the ranked URLs based on the information security ontology that includes trends on at least one of (i) security Vulnerabilities, (ii) threats, (iii) incidents and (iv) controls to a security expert for security analysis.

2. The method of claim 1, wherein the seed URLs are extracted using at least one of (i) standard industrial classification (SIC) and (ii) Machine Learning techniques.

3. The method of claim 1, wherein the security related content in the relevant URLs are classified using at least one of (i) Phrase2Vec or (ii) evolving Ontology based technique, wherein the evolution of ontology technique is based on a bi-directional Long Short-Term Memory (LSTM).

4. The method of claim 1, wherein the classified security related content identifies at least one of (i) vulnerabilities, (ii) threats, (iii) incidents and (iv) controls in the extracted seed URLs.

5. The method of claim 1, wherein the credibility of the URLs that comprise (i) source of information, (ii) genre of site and (iii) content coverage.

6. The method of claim 1, wherein the URLs for the search query comprise (i) relevant security specific search results and (ii) trends on the security vulnerabilities, the threats, the incidents and the controls.

7. A system for retrieving and extracting security information, the system comprising:
    a memory that stores a set of instructions; and
    a processor that executes the set of instructions and is configured to:
        extract seed Uniform Resource Locators (URLs) automatically from social media based on a plurality of keywords that are identified for each sub-domain of a domain of the security information, wherein the plurality of keywords are obtained from a user associated with a first system;
        crawl a security related content in the extracted seed URLs to determine relevant URLs that are related to the domain of the security information from the extracted seed URLs, wherein the relevant URLs are identified by removing non-relevant URLs when a knowledge of content in a hypertext markup language (HTML) anchor text of the extracted seed URLs does not match with the plurality of keywords;
        extract a text that comprise, (a) a full form of a phrase of the acronyms, and (b) document terms, from the relevant URLs by, (i) validating a relevance text between webpage extracted text and an acronym list to identify the full form of a phrase of the acronyms from the relevant URLs, and (ii) indexing, using indexing techniques, each document term from the relevant URLs by comparing, using latent semantic analysis, the webpage extracted text with text from each sub-domain;
        classify the extracted text from the relevant URLs into a plurality of sub-domains of the domain of the security information to obtain domain coverage for the extracted text from the relevant URLs;
        upon utilizing the wide domain coverage, automatically evolving information security ontology based on the classified text using a Long Short-Term Memory (LSTM) deep Learning model;

rank, using the information security ontology, URLs for a search query by the user by accessing credibility of the URLs that comprise the security related content based on domain relevance; and extract the security information from the ranked URLs based on the information security ontology that includes trends on at least one of (i) security Vulnerabilities, (ii) threats, (iii) incidents and (iv) controls to a security expert for security analysis.

8. The system of claim 7, wherein the security related content in the relevant URLs are classified using at least one of (i) Phrase2Vec or (ii) evolving Ontology based technique, wherein the evolution of ontology technique is based on a bi-directional Long Short-Term Memory (LSTM).

9. The system of claim 7, wherein the seed URLs are extracted using at least one of (i) standard industrial classification (SIC) and (ii) Machine Learning techniques.

10. One or more non-transitory computer readable storage mediums storing one or more sequences of instructions, which when executed by one or more processors, causes a method for retrieving and extracting security information, the method comprising:

extracting seed Uniform Resource Locators (URLs) automatically from social media based on a plurality of keywords that are identified for each sub-domain of a domain of the security information, wherein the plurality of keywords are obtained from a user associated with a first system;

crawling a security related content in the extracted seed URLs to determine relevant URLs that are related to the domain of the security information from the extracted seed URLs, wherein the relevant URLs are identified by removing non-relevant URLs when a knowledge of content in a hypertext markup language (HTML) anchor text of the extracted seed URLs does not match with the plurality of keywords;

extracting a text that comprise, (a) a full form of a phrase of the acronyms, and (b) document terms, from the relevant URLs by, (i) validating a relevance text between webpage extracted text and an acronym list to identify the full form of a phrase of the acronyms from the relevant URLs, and (ii) indexing, using indexing techniques, each document term from the relevant URLs by comparing, using latent semantic analysis, the webpage extracted text with text from each sub-domain;

classifying the extracted text from the relevant URLs into a plurality of sub-domains of the domain of the security information to obtain domain coverage for the extracted text from the relevant URLs;

upon utilizing the wide domain coverage, automatically evolving information security ontology based on the classified text using a Long Short-Term Memory (LSTM) deep Learning model;

ranking, using the information security ontology, URLs for a search query by the user by accessing credibility of the URLs that comprise the security related content based on domain relevance; and extracting the security information from the ranked URLs based on the information security ontology that includes trends on at least one of (i) security Vulnerabilities, (ii) threats, (iii) incidents and (iv) controls to a security expert for security analysis.

11. The one or more non-transitory computer readable storage mediums storing the one or more sequences of instructions of claim 10, wherein the seed URLs are extracted using at least one of (i) standard industrial classification (SIC) and (ii) Machine Learning techniques.

12. The one or more non-transitory computer readable storage mediums storing the one or more sequences of instructions of claim 10, wherein the security related content in the relevant URLs are classified using at least one of (i) Phrase2Vec or (ii) evolving Ontology based technique, wherein the evolution of ontology technique is based on a bi-directional Long Short-Term Memory (LSTM).

13. The one or more non-transitory computer readable storage mediums storing the one or more sequences of instructions of claim 12, wherein the classified security related content identifies at least one of (i) vulnerabilities, (ii) threats, (iii) incidents and (iv) controls in the extracted seed URLs.

* * * * *